United States Patent
Nakajima et al.

(10) Patent No.: US 12,371,119 B2
(45) Date of Patent: Jul. 29, 2025

(54) STRADDLED VEHICLE

(71) Applicant: YAMAHA HATSUDOKI KABUSHIKI KAISHA, Iwata (JP)

(72) Inventors: Toshihiro Nakajima, Shizuoka (JP); Takehiro Shimizu, Shizuoka (JP); Shogo Ishida, Shizuoka (JP); Kazuhiko Isayama, Shizuoka (JP); Katsutoshi Satoh, Shizuoka (JP); Tatsuya Kamo, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 816 days.

(21) Appl. No.: 17/558,713

(22) Filed: Dec. 22, 2021

(65) Prior Publication Data

US 2022/0363333 A1 Nov. 17, 2022

(30) Foreign Application Priority Data

May 13, 2021 (JP) .................. 2021-081891

(51) Int. Cl.
- *B62J 17/10* (2020.01)
- *B62J 1/00* (2006.01)
- *B62J 35/00* (2006.01)
- *B62J 40/00* (2020.01)

(52) U.S. Cl.
CPC .............. *B62J 17/10* (2020.02); *B62J 1/00* (2013.01); *B62J 35/00* (2013.01); *B62J 40/00* (2020.02)

(58) Field of Classification Search
CPC ... B62J 17/10; B62J 40/00; B62J 40/10; B62J 1/00; B62J 35/00
See application file for complete search history.

(56) References Cited

U.S. PATENT DOCUMENTS

| | | | | |
|---|---|---|---|---|
| 6,688,274 B2* | 2/2004 | Yokoyama | ............. | B62K 11/04 180/219 |
| 7,438,738 B2* | 10/2008 | Uneta | ............. | F02M 35/10262 180/219 |
| 7,690,463 B2* | 4/2010 | Okamoto | ................. | B62M 7/04 180/68.3 |
| 7,967,316 B2* | 6/2011 | Chisuwa | ................ | B62K 11/04 280/288.4 |
| 9,120,520 B2* | 9/2015 | Miyamoto | ............... | B62J 17/10 |

(Continued)

FOREIGN PATENT DOCUMENTS

JP 2015-016745 A 1/2015

*Primary Examiner* — Alentin Neacsu
*Assistant Examiner* — Michael R Stabley
(74) *Attorney, Agent, or Firm* — Rabin & Berdo, P.C.

(57) ABSTRACT

A straddled vehicle, including a head pipe, a main frame extending rearward from the head pipe, a fuel tank supported by the main frame, an air cleaner arranged in front of the fuel tank, a side cover formed on a lateral side of the fuel tank to partially overlap the fuel tank in a side view of the straddled vehicle, an intake port provided at an edge of the side cover and opening toward an outside of the straddled vehicle, an air cleaner chamber in which at least a part of the air cleaner is arranged, and an intake passage including a first passage between the side cover and a side surface of the fuel tank, the intake port communicating with the air cleaner chamber through the intake passage. The side cover includes a front portion located forward of the air cleaner, and the intake port is arranged rearward of the air cleaner.

10 Claims, 13 Drawing Sheets

(56) References Cited

U.S. PATENT DOCUMENTS

| | | | |
|---|---|---|---|
| 9,643,677 B2* | 5/2017 | Mizukura | B62J 35/00 |
| 10,668,979 B2* | 6/2020 | Okada | B62K 19/48 |
| 10,933,934 B2* | 3/2021 | Tomura | B62J 1/06 |
| 11,628,899 B2* | 4/2023 | Akimoto | B62J 40/00 |
| | | | 280/304.3 |
| 2015/0014079 A1* | 1/2015 | Takasaki | B62J 23/00 |
| | | | 180/229 |
| 2021/0245826 A1* | 8/2021 | Akimoto | B62J 40/00 |
| 2022/0204104 A1* | 6/2022 | Imazeki | B62J 40/10 |
| 2022/0204109 A1* | 6/2022 | Kawabata | B62J 35/00 |

\* cited by examiner

STRADDLED VEHICLE

CROSS-REFERENCE TO RELATED APPLICATIONS

This application is based on, and claims priority from, Japanese Patent Application No. 2021-081891, filed on May 13, 2021. The contents of the application is incorporated herein by reference.

TECHNICAL FIELD

The present invention relates to a straddled vehicle.

BACKGROUND ART

Some straddled vehicles include a fuel tank and a side cover located on a lateral side of the fuel tank. An air cleaner is arranged inside the side cover, and the side cover is provided with an intake port for taking air into the air cleaner. As illustrated in Japan Laid-Open Patent Application Publication No. 2015-016745, conventionally, the intake port is provided at the front portion of the side cover and opens toward the front.

SUMMARY

As described above, when the intake port is provided at the front portion of the side cover, an intake passage extending rearward from the intake port is arranged inside the front portion of the side cover. Therefore, as the width of the side cover increases, the vehicle becomes larger in the left-right direction and the weight of the vehicle increases. Further, since the intake port is opened toward the front at the front portion of the side cover, water easily enters the intake port from the front while the vehicle is running. An object of the present invention is to reduce the width of the side cover, reduce the weight of the vehicle, and suppress the intrusion of water into the intake port during traveling in a straddled vehicle.

A straddled vehicle according to one aspect of the present invention includes a head pipe, a main frame, a fuel tank, an air cleaner, a side cover, an intake port, an air cleaner chamber, and an intake passage. The main frame extends rearward from the head pipe. The fuel tank is supported by the main frame. The air cleaner is arranged in front of the fuel tank. The side cover is arranged on a lateral side of the fuel tank, and at least a part of the side cover overlaps with the fuel tank in a vehicle side view. The intake port is provided at an edge of the side cover and opens toward an outside of the vehicle. At least a part of the air cleaner is arranged in the air cleaner chamber. The intake passage includes a first passage between the side cover and a side surface of the fuel tank. The intake passage communicates the intake port with the air cleaner chamber. The side cover includes a front portion located forward of the air cleaner. The intake port is located rearward of the air cleaner.

In the straddled vehicle according to the present aspect, the intake port is arranged rearward of the air cleaner. Therefore, air is taken into the intake port at a position rearward of the air cleaner at the side cover and sent to the air cleaner through the first passage between the side cover and the side surface of the fuel tank. Therefore, the width of the front portion of the side cover is reduced because the intake passage is not arranged inside the front portion of the side cover. Further, as compared with the case where the intake port is arranged at the front portion of the side cover, the intrusion of water into the intake port during traveling is suppressed. Further, as the intake passage becomes shorter, the space for forming the intake passage becomes smaller. As a result, a degree of freedom in a layout of other members is increased. Further, since the side surface of the fuel tank forms a part of the intake passage, the number of members for forming the intake passage is reduced. As a result, the weight of the vehicle is reduced.

The intake port may be open facing downward. In this case, the intrusion of water from the intake port is further suppressed.

The straddled vehicle may further include a seat. The seat may be located above the fuel tank. The intake passage may further include a second passage between the seat and the fuel tank. In this case, in addition to the first passage, the second passage between the seat and the fuel tank is also used as an intake passage, so that air can be efficiently supplied to the air cleaner.

The straddled vehicle may further include a partition member. The partition member may be arranged between the second passage and the air cleaner chamber. The partition member may include a hole. In this case, the partition member can prevent water from entering the air cleaner.

The partition member may include a side hole provided on a side portion of the partition member. In this case, the air from the first passage can be efficiently taken into the air cleaner chamber through the side hole.

The partition member may further include a central hole. The central hole may be arranged between a center of the partition member in a vehicle width direction and the side hole. In this case, the air from the second passage between the seat and the fuel tank can be efficiently taken into the air cleaner chamber through the central hole.

The edge of the side cover may include a recess that is recessed upward. The intake port may be provided in the recess. In this case, the intrusion of water from the intake port is further suppressed.

In the vehicle side view, the edge of the recess may overlap the main frame. The intake port may be arranged behind the main frame at the edge of the recess. In this case, the intrusion of water from the intake port is further suppressed.

The side cover may include a rib arranged in the first passage. In this case, the rib reinforce the side cover. Further, the air passing through the first passage is rectified by the rib, so that the air can be easily taken in.

The side surface of the fuel tank may have a shape recessed toward the inside of the fuel tank so that the space in the first passage is expanded. In this case, it becomes easier to take in air into the first passage.

DESCRIPTION OF EMBODIMENTS

Figure 1:
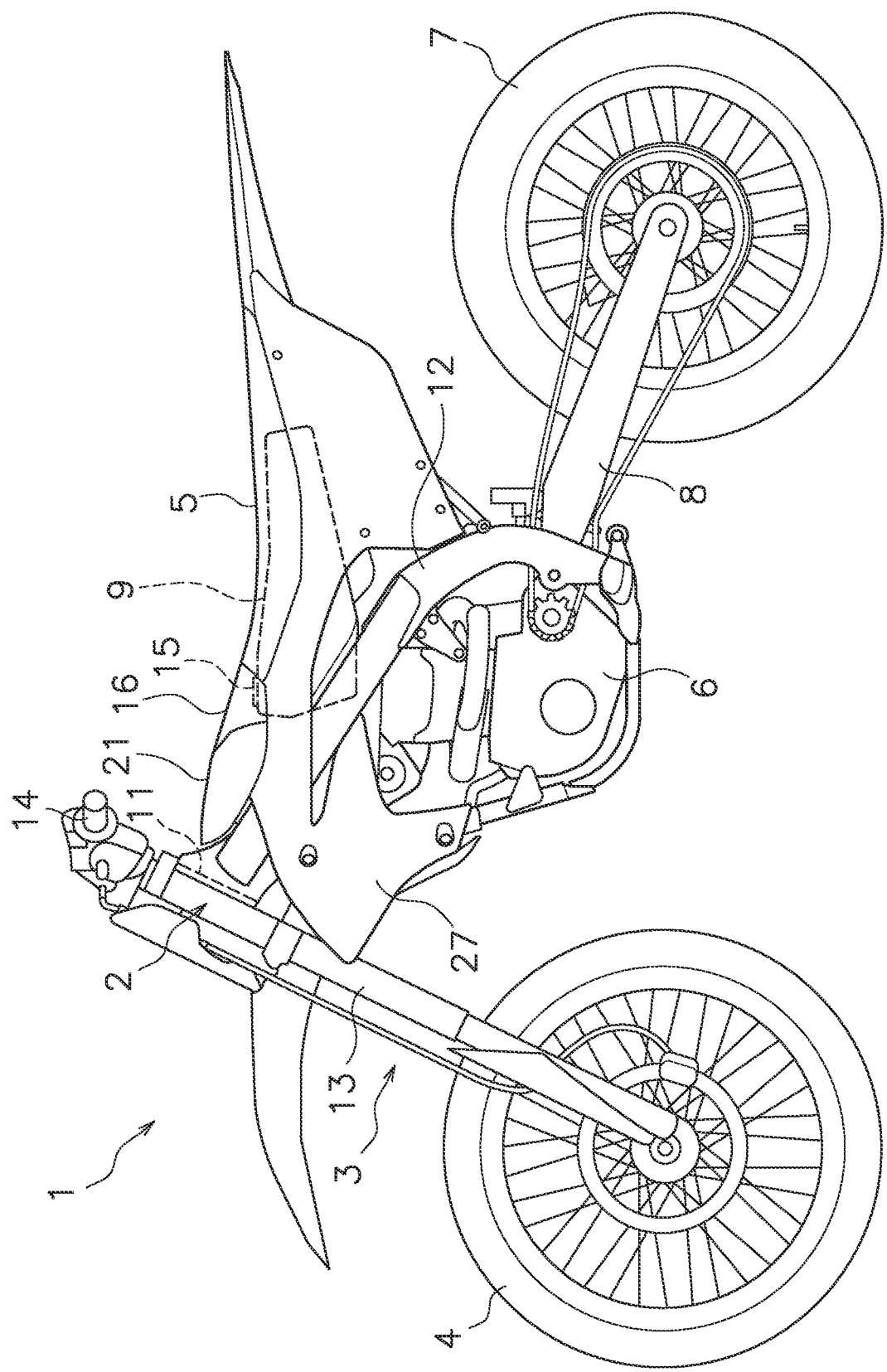
FIG. 1 is a side view of a straddled vehicle according to an embodiment.

Hereinafter, a straddled vehicle according to an embodiment will be described with reference to the drawings. FIG. 1 is a side view of the straddled vehicle 1 according to the embodiment. As illustrated in FIG. 1, the straddled vehicle 1 includes a vehicle body frame 2, a steering device 3, a front wheel 4, a seat 5, an engine 6, a rear wheel 7, a swing arm 8, and a fuel tank 9. In the present embodiment, front-back and left-right directions mean the front-back and left-right directions as seen from a rider seated on the seat 5.

The vehicle body frame 2 includes a head pipe 11 and a main frame 12. The head pipe 11 extends forward and downward. The main frame 12 is connected to the head pipe 11. The main frame 12 extends rearward from the head pipe 11. The main frame 12 extends rearward and downward from the head pipe 11. The main frame 12 passes above the engine 6 and bends downward behind the engine 6.

In this specification, "connection" and its derivatives are not limited to a plurality of separate parts being connected to each other by welding, adhesion, or fixing means such as bolts, and may mean that a plurality of portions included in an integral part are continuously connected with each other.

The steering device 3 is rotatably supported by the head pipe 11. The steering device 3 is configured to be steered by the rider. The steering device 3 includes a front fork 13 and a handle member 14. The front fork 13 rotatably supports the front wheel 4. The front fork 13 is rotatably supported by the head pipe 11. The handle member 14 is connected to the front fork 13.

The seat 5 is arranged behind the head pipe 11. The seat 5 is supported by the main frame 12. The engine 6 is arranged below the seat 5. The engine 6 is supported by the main frame 12. The engine 6 generates a driving force for rotating the rear wheel 7. The rear wheel 7 is arranged behind the engine 6. The rear wheel 7 is connected to the main frame 12 via the swing arm 8. The swing arm 8 is swingably supported by the main frame 12. The rear wheel 7 is rotatably supported by the swing arm 8.

Figure 2:
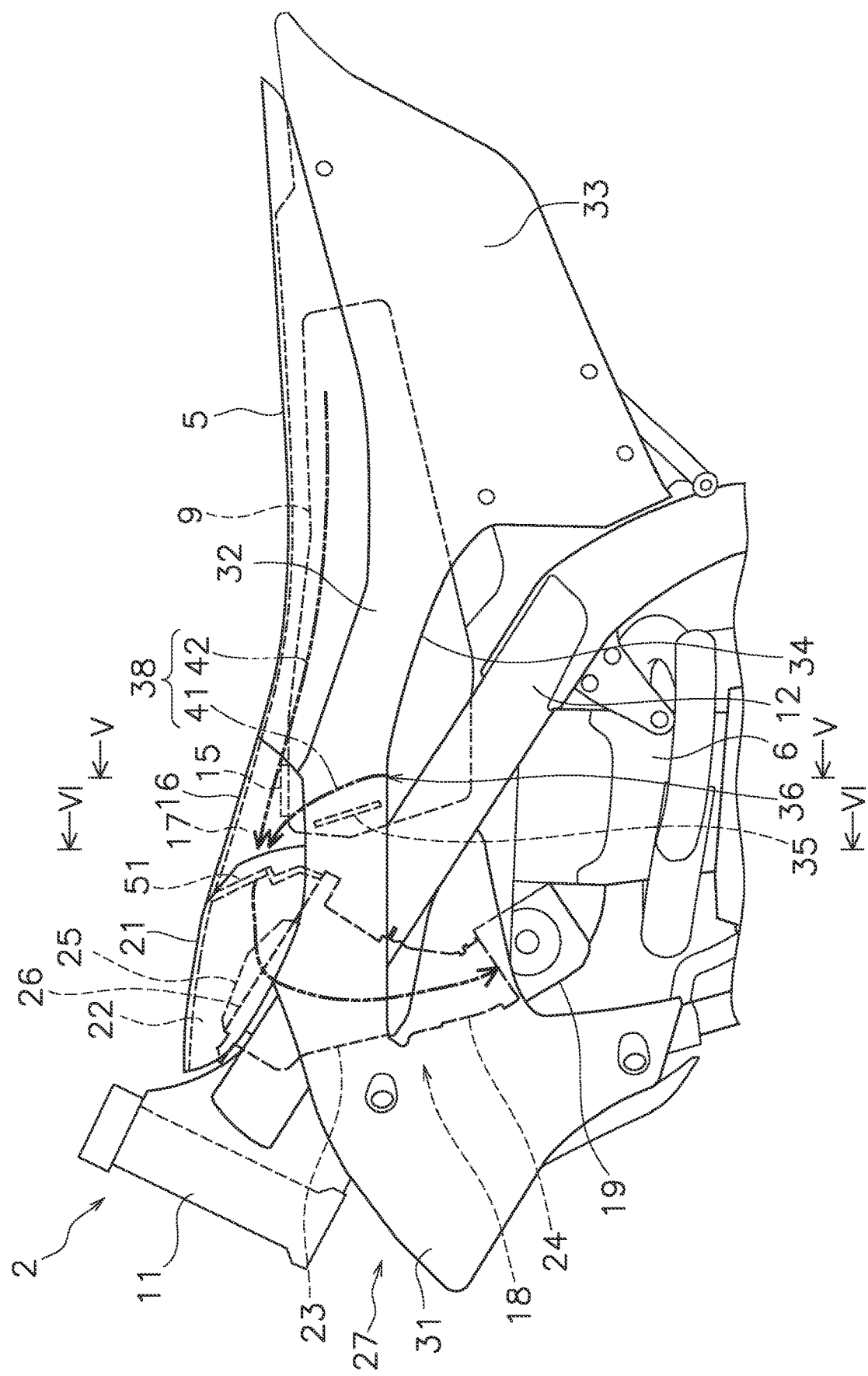
FIG. 2 is an enlarged left side view of the straddled vehicle.
Figure 3:
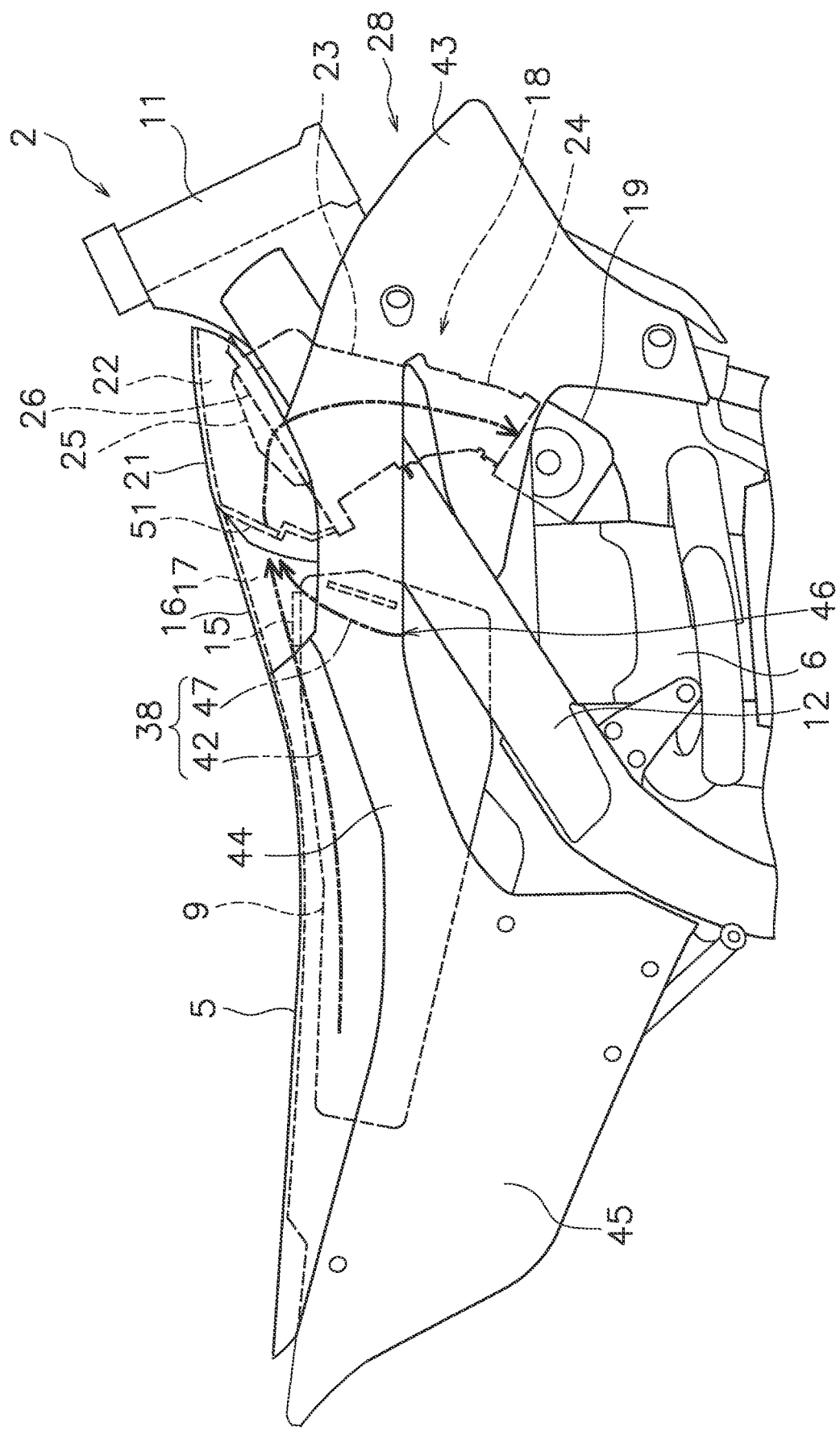
FIG. 3 is an enlarged right side view of the straddled vehicle.
Figure 4:
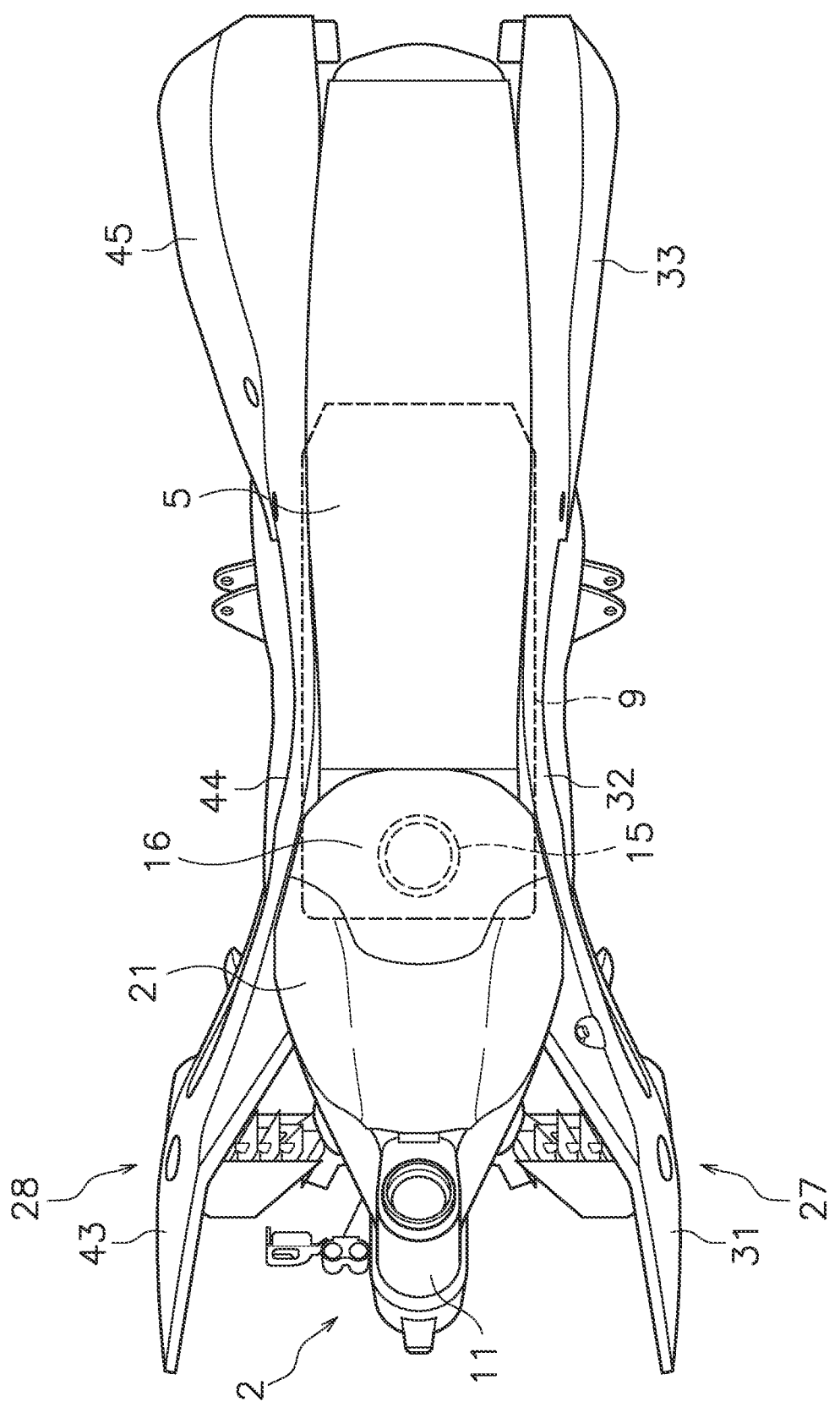
FIG. 4 is an enlarged top view of the straddled vehicle.

FIG. 2 is an enlarged left side view of the straddled vehicle 1. FIG. 3 is an enlarged right side view of the straddled vehicle 1. FIG. 4 is an enlarged top view of the straddled vehicle 1. As illustrated in FIGS. 2 and 3, the fuel tank 9 is arranged behind the head pipe 11. The seat 5 is arranged above the fuel tank 9. The fuel tank 9 is supported by the main frame 12. The fuel tank 9 includes a fuel filler port 15. The fuel filler port 15 is provided on an upper surface of the fuel tank 9. A fuel filler port cover 16 is arranged above the fuel filler port 15. The fuel filler port cover 16 is arranged in front of the seat 5. The fuel filler port cover 16 is arranged flush with the seat 5. The fuel filler port cover 16 is arranged between the head pipe 11 and the seat 5. A fuel filler port chamber 17 is provided in the fuel filler port cover 16. The fuel filler port 15 is arranged in the fuel filler port chamber 17.

An air cleaner 18 is arranged in front of the fuel tank 9. The air cleaner 18 is arranged forward of the engine 6. The air cleaner 18 is connected to the engine 6 through a throttle valve 19. An air cleaner cover 21 is arranged above the air cleaner 18. The air cleaner cover 21 is arranged in front of the fuel filler port cover 16. The air cleaner cover 21 is arranged between the fuel filler port cover 16 and the head pipe 11. The air cleaner cover 21 covers the air cleaner 18 from above.

An air cleaner chamber 22 is provided in the air cleaner cover 21. The air cleaner 18 is arranged in the air cleaner chamber 22. Specifically, the air cleaner 18 includes a cleaner body 23, a duct 24, and a filter element 25. The cleaner body 23 includes a cleaner intake port 26. The cleaner intake port 26 is arranged in the air cleaner chamber 22. The filter element 25 is attached to the cleaner intake port 26. The duct 24 is connected to the throttle valve 19.

The straddled vehicle 1 includes a first side cover 27 and a second side cover 28. As illustrated in FIG. 4, the first side cover 27 is arranged on the left side of the fuel tank 9. At least a part of the first side cover 27 overlaps with the fuel tank 9 in a vehicle side view. The first side cover 27 is arranged outside the main frame 12 in the vehicle width direction. The first side cover 27 covers the main frame 12 from the lateral side. In the vehicle side view, the first side cover 27 overlaps at least a part of the main frame 12. In the vehicle side view, at least a part of the first side cover 27 is located above the engine 6.

Specifically, the first side cover 27 includes a first front portion 31, a first intermediate portion 32, and a first rear portion 33. The first front portion 31 is located forward of the air cleaner 18. The first intermediate portion 32 is located between the first front portion 31 and the first rear portion 33. The first rear portion 33 is located behind the first intermediate portion 32.

The first intermediate portion 32 overlaps with the fuel tank 9 in the vehicle side view. In the vehicle side view, the first intermediate portion 32 overlaps with the air cleaner 18. The first intermediate portion 32 is arranged outside the main frame 12 in the vehicle width direction. The first intermediate portion 32 covers the main frame 12 from the lateral side. In the vehicle side view, the first intermediate portion 32 overlaps with the main frame 12. The first intermediate portion 32 is located above the engine 6 in the vehicle side view.

The first side cover 27 includes a first recess 34. The first recess 34 is located between the first front portion 31 and the first rear portion 33. The first recess 34 is located below the first intermediate portion 32. An edge of the first recess 34 overlaps with the main frame 12. The edge of the first recess 34 is a lower edge of the first intermediate portion 32. As illustrated in FIG. 4, the first side cover 27 has a shape recessed inward in the vehicle width direction in the first intermediate portion 32. The first side cover 27 includes a reinforcing rib 35. The reinforcing rib 35 is arranged in the first passage 41. The reinforcing rib 35 is arranged on an inner surface of the first intermediate portion 32. The reinforcing rib 35 extends forward and upward.

Figure 5:
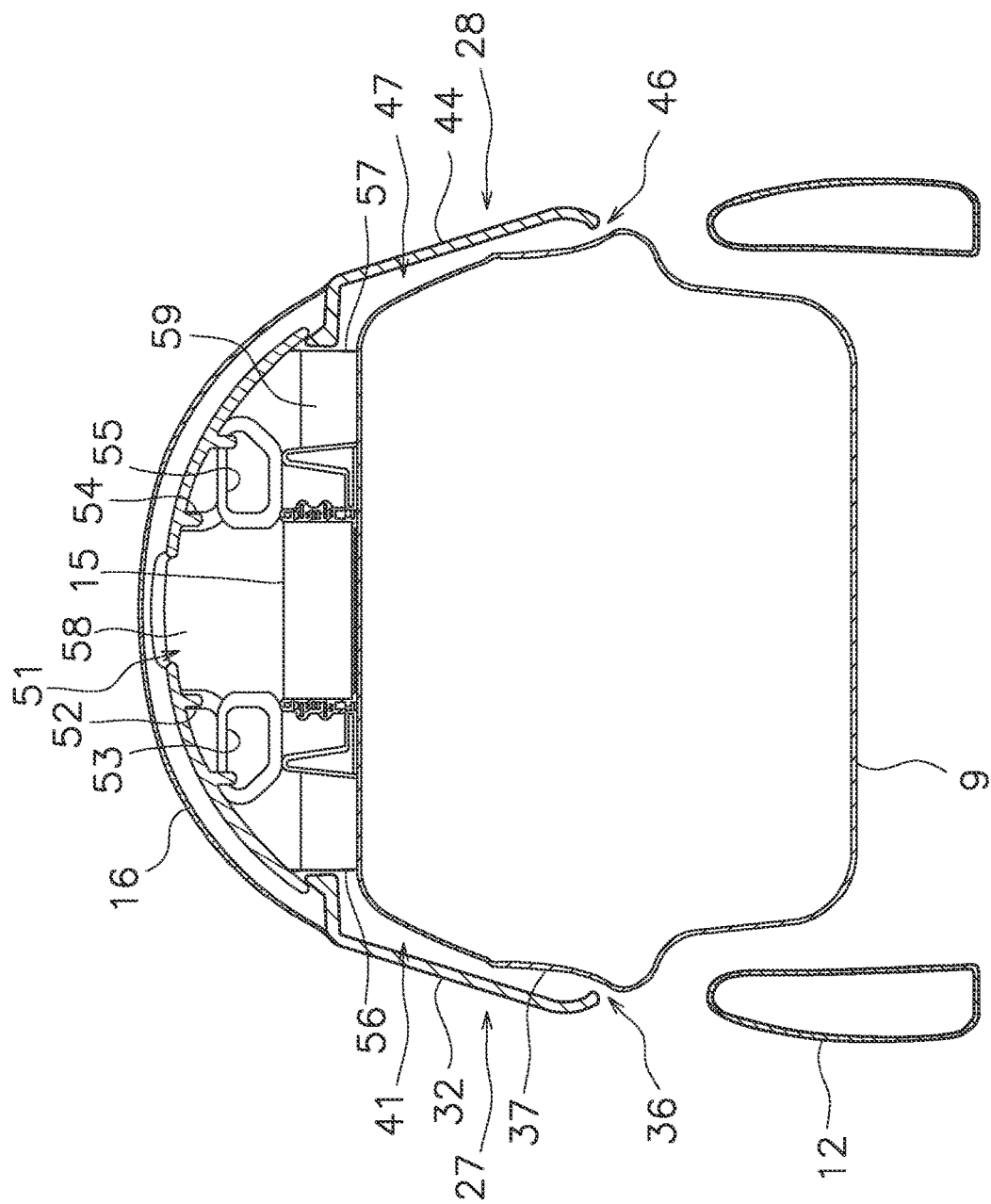
FIG. 5 is a cross-sectional view taken along line V-V in FIG. 2.

FIG. 5 is a cross-sectional view taken along line V-V in FIG. 2. As illustrated in FIGS. 2 and 5, the straddled vehicle 1 includes a first intake port 36. The first intake port 36 opens toward the outside of the vehicle. The first intake port 36 is arranged rearward of the air cleaner 18. The first intake port 36 is provided between the lower edge of the first intermediate portion 32 and a side surface 37 of the fuel tank 9. The first intake port 36 opens downward. At least a part of the first intake port 36 is arranged below the fuel filler port cover 16 in the vehicle side view. The first intake port 36 is provided in the first recess 34. The first intake port 36 is arranged behind the main frame 12 at the edge of the first recess 34. The first intake port 36 is arranged adjacent to the reinforcing rib 35. The reinforcing rib 35 rectifies the air from the first intake port 36, so that the air can be easily taken in.

As illustrated in FIG. 2, the straddled vehicle 1 includes an intake passage 38. The intake passage 38 supplies air to the air cleaner 18. The intake passage 38 includes a first passage 41 and a second passage 42. The first passage 41 is provided between the first side cover 27 and the side surface 37 of the fuel tank 9. The side surface 37 of the fuel tank 9 has a shape recessed toward the inside of the fuel tank 9. As a result, the space in the first passage 41 is expanded. The first passage 41 extends from the first intake port 36 to the air cleaner chamber 22 through a space between the first side cover 27 and the side surface 37 of the fuel tank 9 and the fuel filler port chamber 17. The second passage 42 is provided between the seat 5 and the fuel tank 9. The second passage 42 extends from a gap between the seat 5 and the first side cover 27 to the air cleaner chamber 22 through a space between the seat 5 and the fuel tank 9 and the fuel filler port chamber 17.

As illustrated in FIG. 5, the second side cover 28 is arranged on the right side of the fuel tank 9. The second side cover 28 has a symmetrical shape with the first side cover 27. However, the second side cover 28 may have a shape partially different from that of the first side cover 27. As illustrated in FIG. 3, the second side cover 28 includes a second front portion 43, a second intermediate portion 44, and a second rear portion 45. The second front portion 43, the second intermediate portion 44, and the second rear portion 45 of the second side cover 28 have a same structure as the first front portion 31, the first intermediate portion 32, and the first rear portion 33 of the first side cover 27, respectively, and detailed description thereof will be omitted.

The straddled vehicle 1 includes a second intake port 46. The second intake port 46 is provided symmetrically with the first intake port 36. The intake passage 38 further includes a third passage 47. The third passage 47 is provided symmetrically with the first passage 41. The third passage 47 has the same structure as the first passage 41, and detailed description thereof will be omitted.

Figure 6:
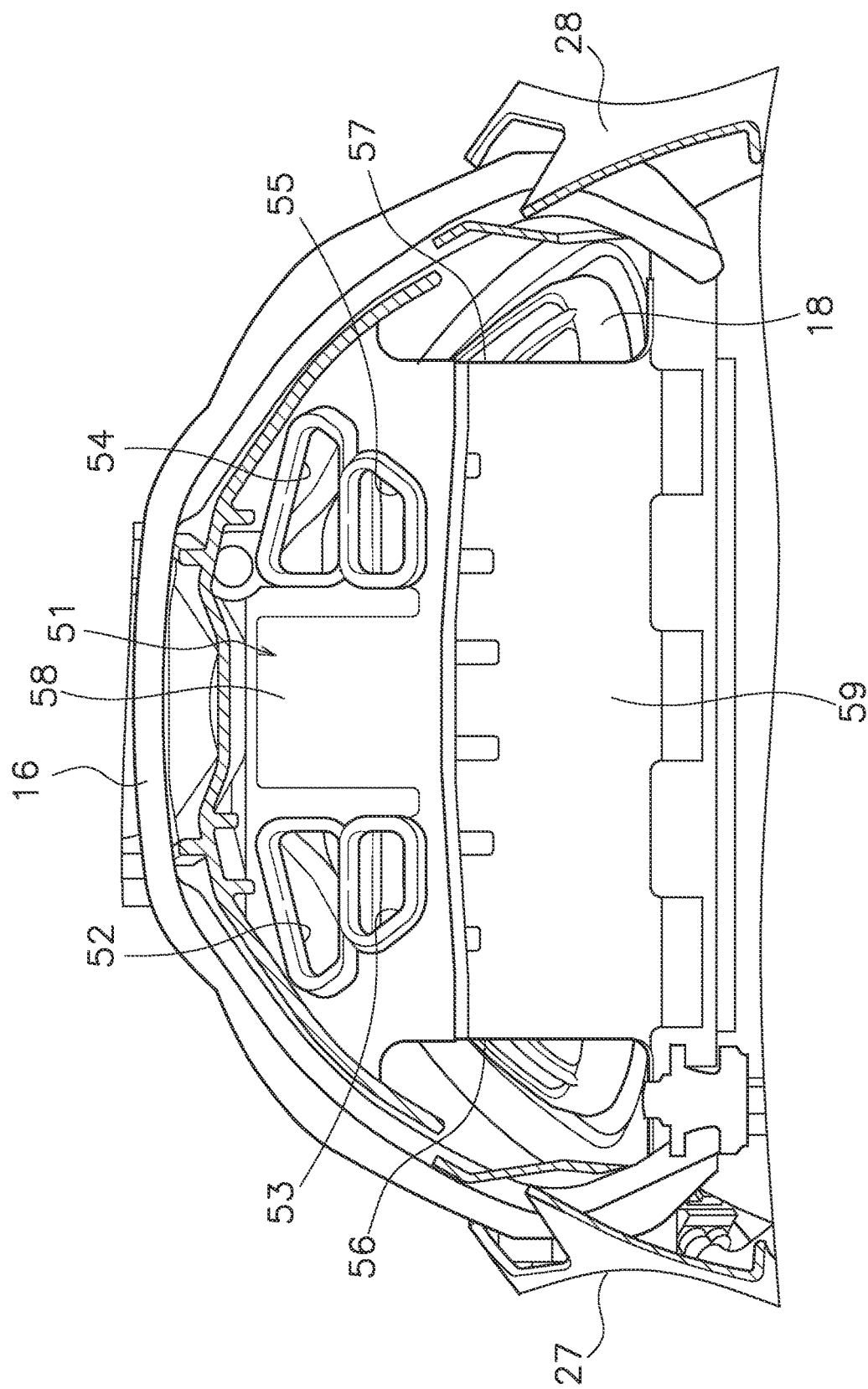
FIG. 6 is a cross-sectional view taken along line VI-VI in FIG. 2.

As illustrated in FIG. 2, the air cleaner cover 21 includes a partition member 51. The partition member 51 is arranged between the fuel filler port chamber 17 and the air cleaner chamber 22. The partition member 51 separates the fuel filler port chamber 17 and the air cleaner chamber 22. FIG. 6 is a cross-sectional view taken along line VI-VI in FIG. 2. As illustrated in FIG. 6, the partition member 51 includes a plurality of central holes 52 to 55, a left side hole 56, and a right side hole 57. The plurality of central holes 52 to 55 and the left and right side holes 56 and 57 communicate the fuel filler port chamber 17 with the air cleaner chamber 22. The left side hole 56 is provided at the left end of the partition member 51. The right side hole 57 is provided at the right end of the partition member 51. The left side hole 56 is arranged in front of the first passage 41. The right side hole 57 is arranged in front of the third passage 47.

The plurality of central holes 52 to 55 are arranged between the left and right side holes 56 and 57. The plurality of central holes 52 to 55 include left central holes 52 and 53 and right central holes 54 and 55. The left central holes 52 and 53 are arranged between the center of the partition member 51 in the vehicle width direction and the left side hole 56. The right center holes 54 and 55 are arranged between the center of the partition member 51 in the vehicle width direction and the right side hole 57.

The partition member 51 includes an upper partition portion 58 and a lower partition portion 59. The left and right side holes 56 and 57 and the plurality of central holes 52 to 55 are provided in the upper partition portion 58. The lower partition portion 59 is arranged below the upper partition portion 58. The lower partition portion 59 is connected to the air cleaner 18.

In the straddled vehicle 1 according to the present embodiment, air is taken into the first passage 41 from the first intake port 36. The air flows from the first passage 41 through the air cleaner chamber 22 and enters from the cleaner intake port 26 into the air cleaner 18. Further, air is taken into the second passage 42 through the gap between the seat 5 and the first side cover. The air flows from the second passage 42 through the air cleaner chamber 22 and enters from the cleaner intake port 26 into the air cleaner 18. Air is also taken in from the second intake port 46 and the third passage 47 in the same manner as in the first intake port 36 and the first passage 41. The air flows from the third passage 47 through the air cleaner chamber 22, and enters from the cleaner intake port 26 into the air cleaner 18. The air passes through the air cleaner 18 and is supplied to the engine 6.

In the straddled vehicle 1 according to the present embodiment described above, the first intake port 36 is arranged rearward of the air cleaner 18. Therefore, the air is taken into the first intake port 36 at a position rearward from the air cleaner 18 in the first side cover 27, and is sent to the air cleaner 18 through the first passage 41. Therefore, since the intake passage 38 is not arranged inside the front portion 31 of the first side cover 27, the width of the front portion 31 of the first side cover 27 is reduced. Further, as compared with the case where the first intake port 36 is arranged at the front portion 31 of the first side cover 27, the intrusion of water into the first intake port 36 during traveling is suppressed. The same effect as described above can be obtained for the second side cover 28 and the second intake port 46.

Although one embodiment of the present invention has been described above, the present invention is not limited to the above embodiment, and various modifications can be made without departing from the gist of the invention.

The configuration of the straddled vehicle 1 is not limited to that of the above embodiment, and may be changed. For example, the shape of the main frame 12 may be changed. The shapes of the first side cover 27 and the second side cover 28 are not limited to those of the above embodiment, and may be changed. The first side cover 27 and the second side cover 28 may be arranged opposite to those in the above embodiment on the left and right sides. The positions of the first intake port 36 and the second intake port 46 are not limited to those of the above embodiment, and may be changed. The first intake port 36 and the second intake port 46 may be arranged opposite to those in the above embodiment on the left and right sides.

The positions, shapes, and numbers of the left and right side holes 56 and 57 of the partition member 51 are not limited to those of the above embodiment, and may be changed. The positions, shapes, and numbers of the central holes 52 to 55 of the partition member 51 are not limited to those of the above embodiment, and may be changed.

Figure 7:
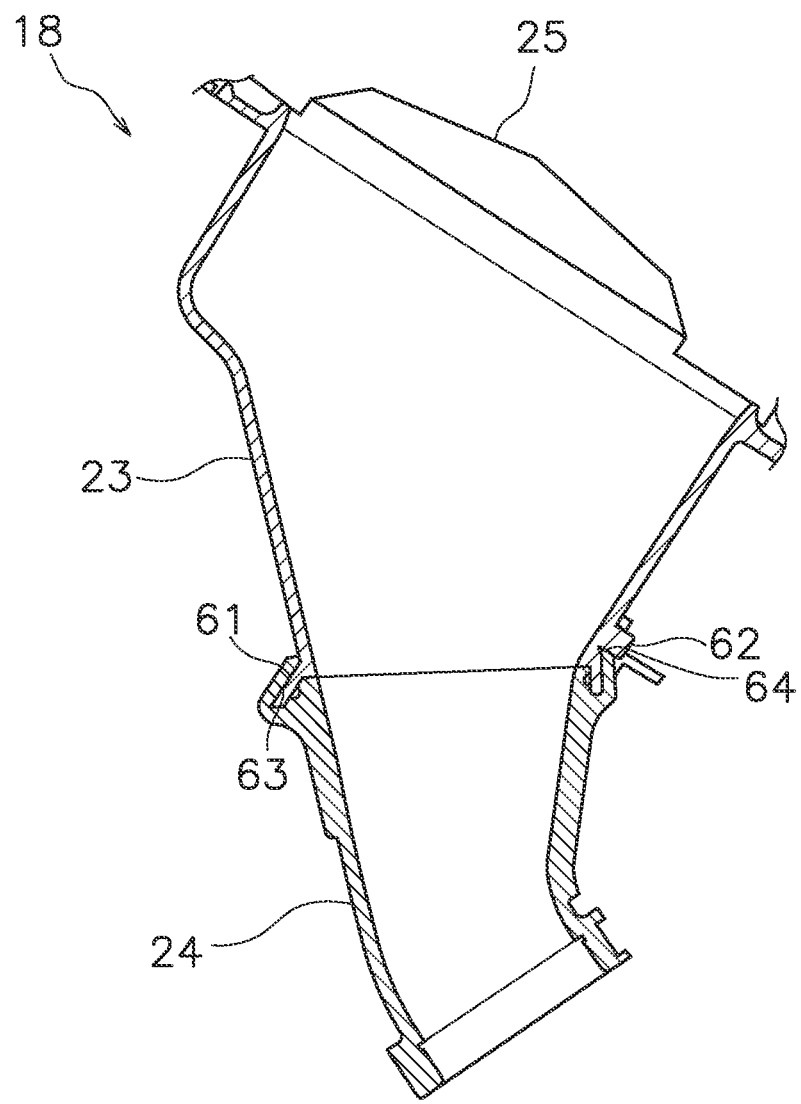
FIG. 7 is a cross-sectional view showing an example of an air cleaner.

FIG. 7 is a cross-sectional view showing an example of the air cleaner 18. As illustrated in FIG. 7, the cleaner body 23 and the duct 24 may be provided separately each other. The cleaner body 23 may be made of a hard resin. The duct 24 may be made of an elastic material such as rubber. The cleaner body 23 may include a fitting protrusion 61 and a locking protrusion 62. The duct 24 may include a fitting hole 63 and a locking hole 64. When assembling the cleaner body 23 and the duct 24, the locking protrusion 62 may be locked into the locking hole 64 by bending the duct 24 in a state where the fitting protrusion 61 of the cleaner body 23 is fitted into the fitting hole 63 of the duct 24. In this case, the cleaner body 23 and the duct 24 are connected without a fixing member such as a bolt. As a result, the number of parts is reduced, and the weight of the air cleaner 18 is reduced. Also, the cost of the air cleaner 18 is reduced.

Figure 8:
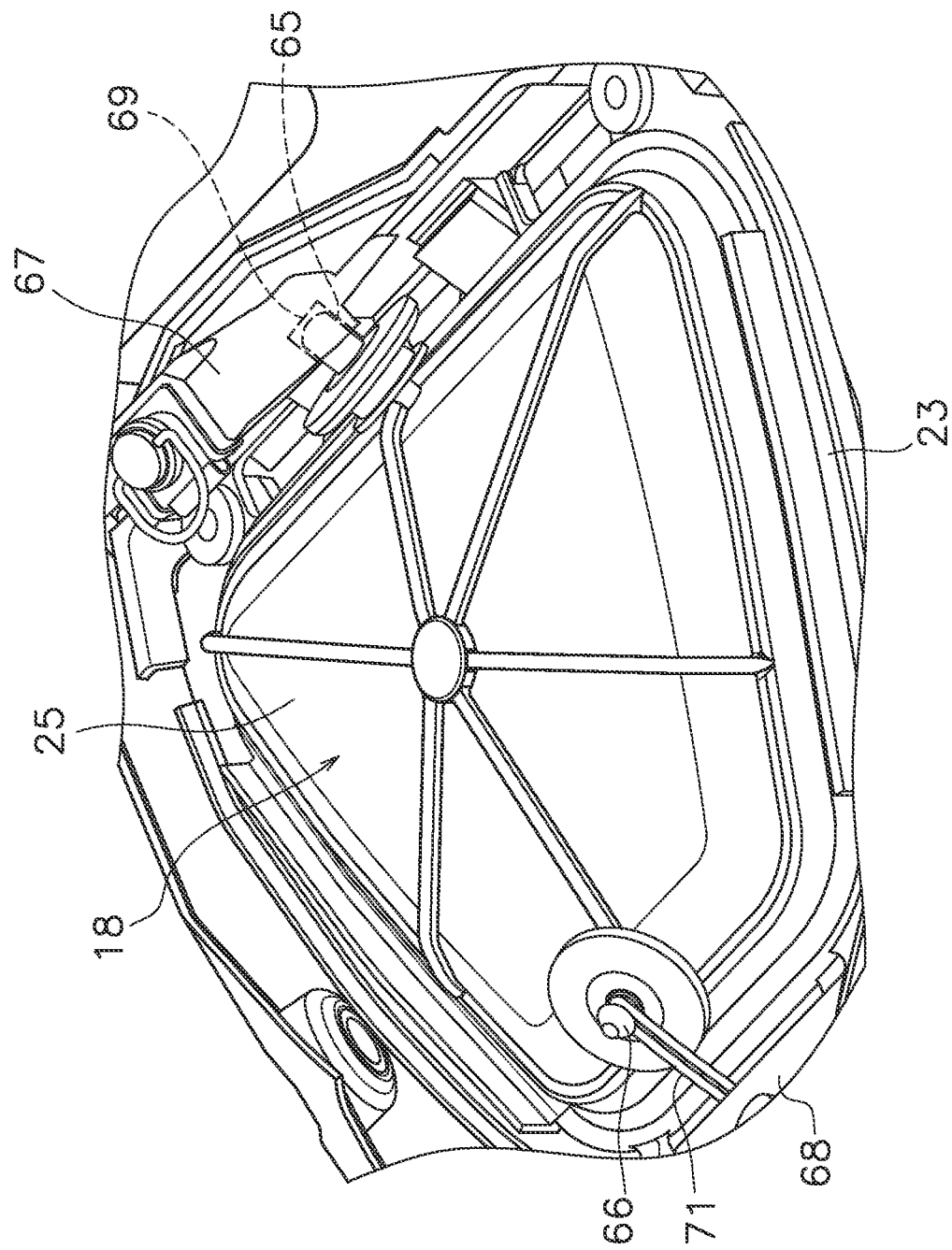
FIG. 8 is a diagram showing an example of a mounting structure of a filter element.

FIG. 8 is a diagram showing an example of a mounting structure of the filter element 25. The filter element 25 may include a first mounting protrusion 65 and a second mounting protrusion 66. The straddled vehicle 1 may include a first cleaner support 67 and a second cleaner support 68. The first cleaner support 67 may be connected to the partition member 51 described above. The first cleaner support 67 may include a mounting recess 69. The first mounting protrusion 65 may be engaged to the mounting recess 69.

The second cleaner support 68 may be connected to the cleaner body 23. A band 71 made of an elastic material such as rubber may be connected to the second cleaner support 68. The band 71 may connect the second mounting protrusion 66 to the second cleaner support 68. In this case, the filter element 25 is attached to the cleaner body 23 without a metal fixing member. As a result, the weight of the air cleaner 18 is reduced. Also, the cost of the air cleaner 18 is reduced.

Figure 9:
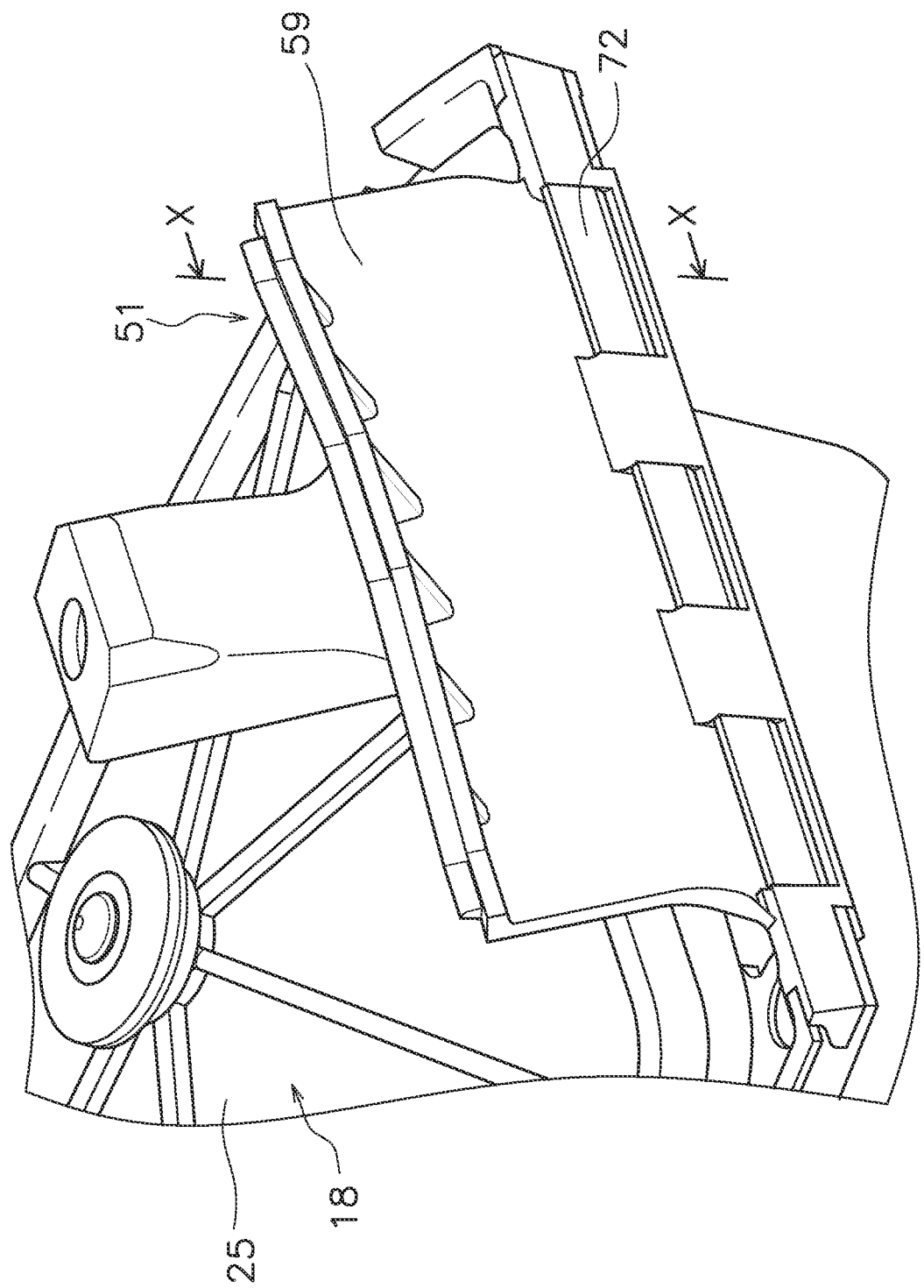
FIG. 9 is a diagram showing an example of a mounting structure of a lower partition portion and the air cleaner.
Figure 10:
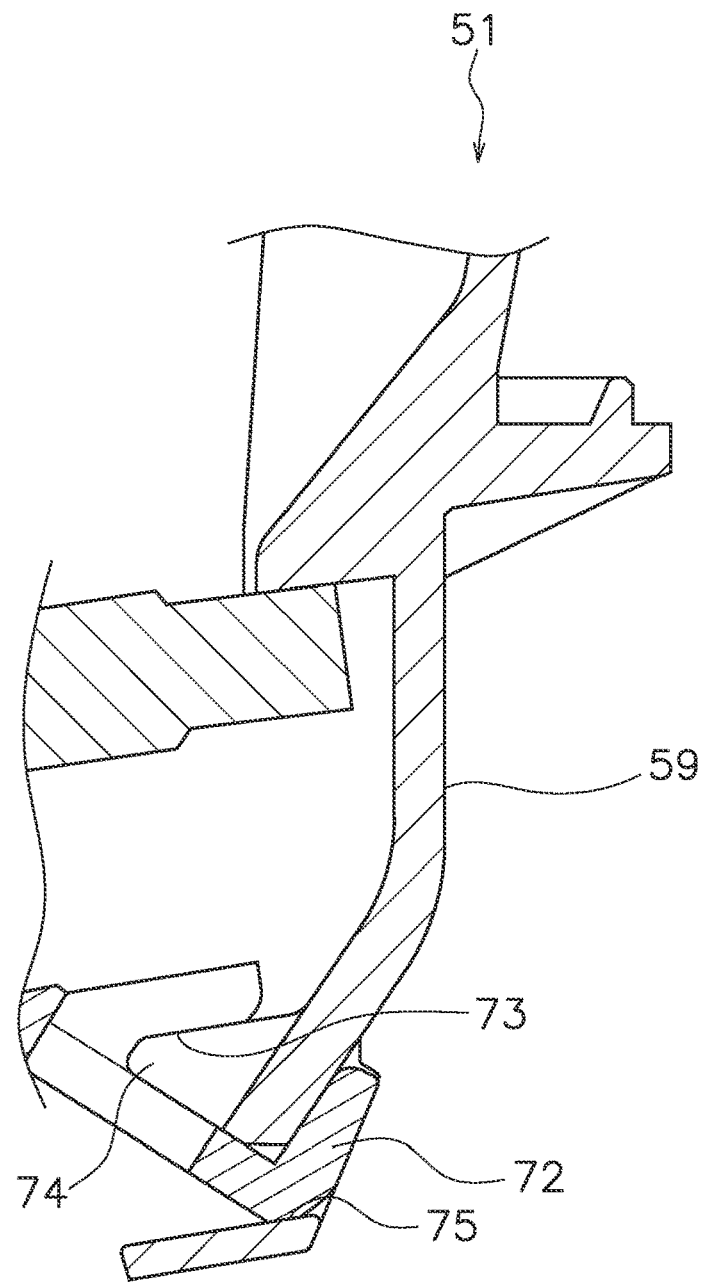
FIG. 10 is a cross-sectional view taken along the line X-X in FIG. 9.

The upper partition portion 58 and the lower partition portion 59 may be integrated with each other. Alternatively, the upper partition portion 58 and the lower partition portion 59 may be provided separately each other. FIG. 9 is a diagram showing an example of a mounting structure of the lower partition portion 59 and the air cleaner 18. FIG. 10 is a cross-sectional view taken along the line X-X in FIG. 9. As illustrated in FIGS. 9 and 10, the air cleaner 18 may include a locking convex portion 72 and a locking recess 73. The lower partition portion 59 may include a locking protrusion 74 and a locking hole 75. The locking protrusion 74 may be locked in the locking recess 73. The locking convex portion 72 may be inserted into the locking hole 75 and locked in the locking hole 75. The locking convex portion 72 may be locked in the locking hole 75 by rotating the lower partition portion 59 in a state where the locking protrusion 74 is inserted into the locking recess 73. In this case, the air cleaner 18 and the lower partition portion 59 are connected without a fixing member such as a bolt. As a result, the number of parts is reduced, and the weight of the air cleaner 18 is reduced. Also, the cost of the air cleaner 18 is reduced. Furthermore, the assembly time are reduced.

Figure 11:
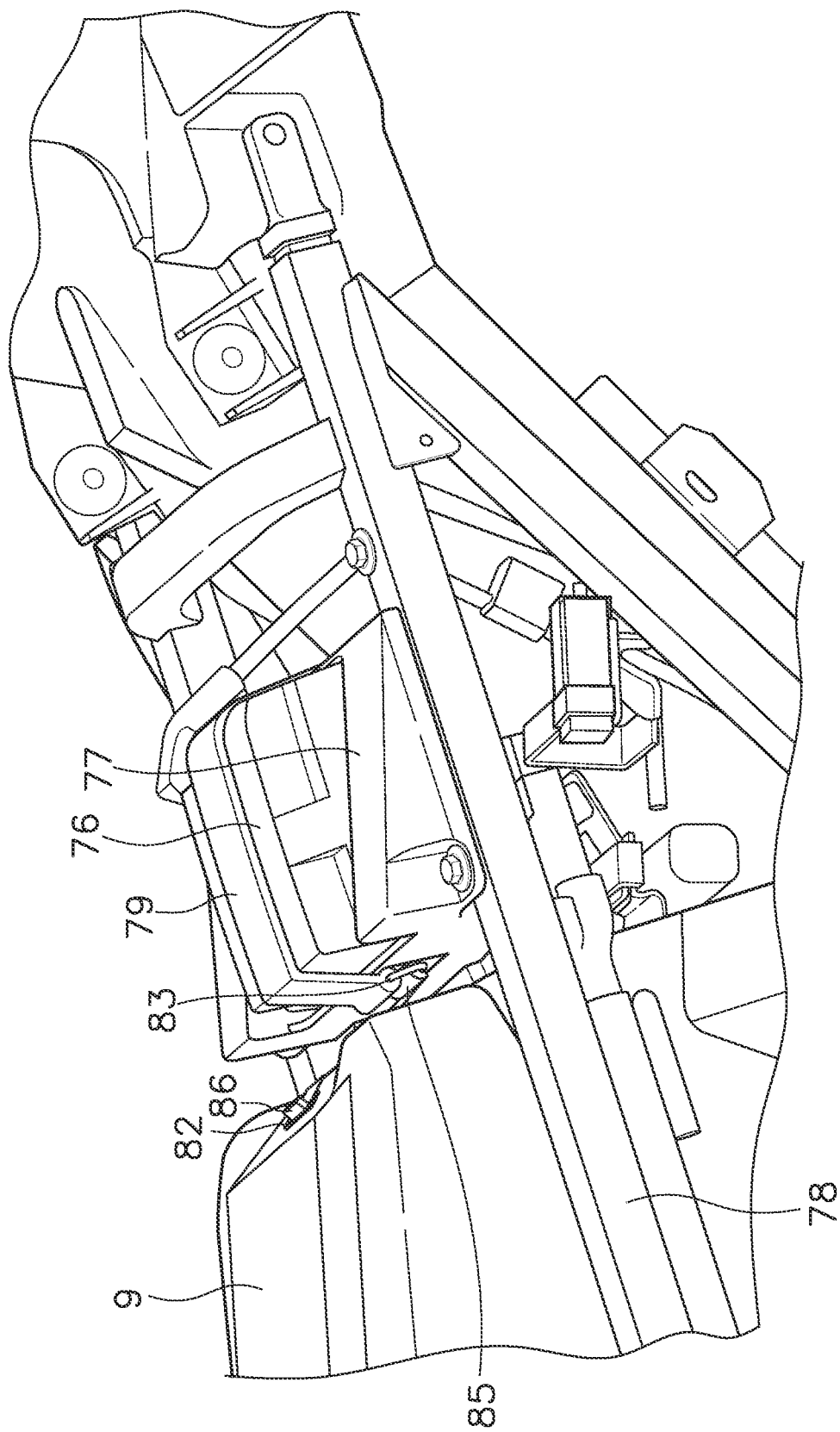
FIG. 11 is a diagram showing an example of a fixed structure of the fuel tank.

FIG. 11 is a diagram showing an example of a fixed structure of the fuel tank 9. As illustrated in FIG. 11, a battery 76 is arranged behind the fuel tank 9. A battery bracket 77 is arranged below the battery 76. The battery bracket 77 is connected to the rear frame 78. The rear frame 78 is connected to the main frame 12 and extends rearward from the main frame 12. The battery 76 is fixed to the rear frame 78 by a battery band 79. The fuel tank 9 may be fixed to the rear frame 78 by the battery band 79.

Figure 12:
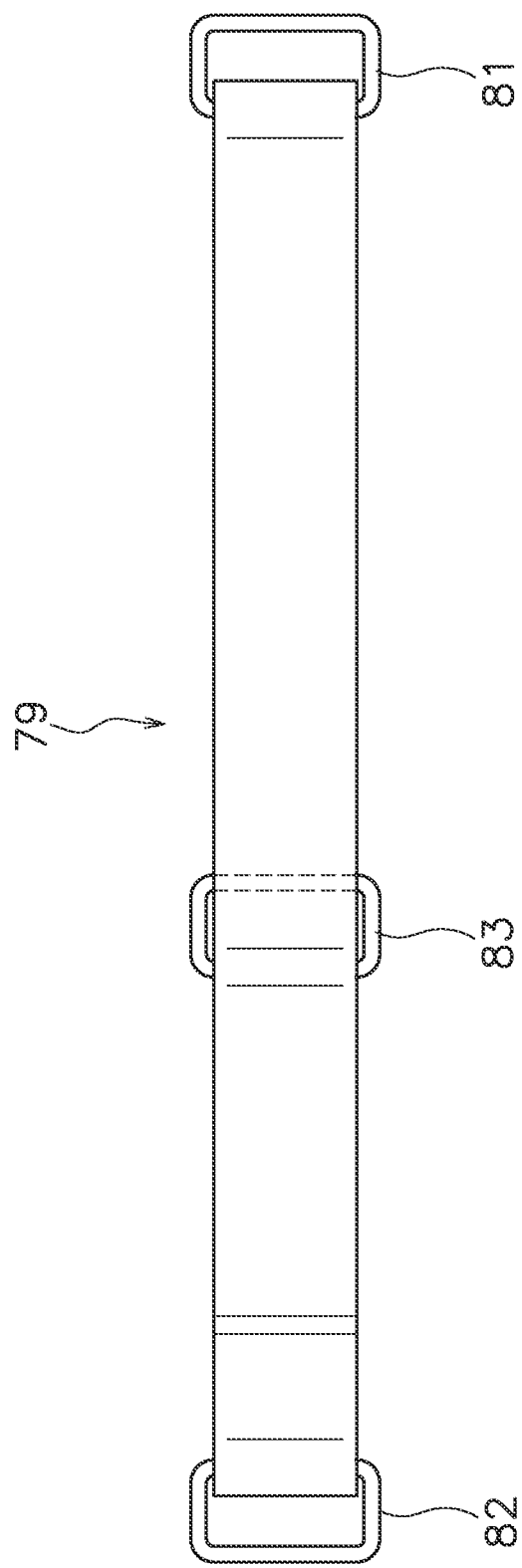
FIG. 12 is a diagram showing an example of a battery band.

FIG. 12 is a diagram showing an example of the battery band 79. The battery band 79 may include a first mounting portion 81, a second mounting portion 82, and a third mounting portion 83. The first mounting portion 81 may be connected to one end of the battery band 79. The second mounting portion 82 may be connected to the other end of the battery band 79. The third mounting portion 83 may be arranged between the first mounting portion 81 and the second mounting portion 82. The first mounting portion 81 may be locked to the first locking portion (not illustrated) of the battery bracket 77. The second mounting portion 82 may be locked to the second locking portion 86 of the fuel tank 9. The third mounting portion 83 may be locked to the third locking portion 85 of the battery bracket 77. In this case, the fuel tank 9 is attached to the rear frame 78 without fixing members such as bolts. Therefore the cost is reduced.

Figure 13:
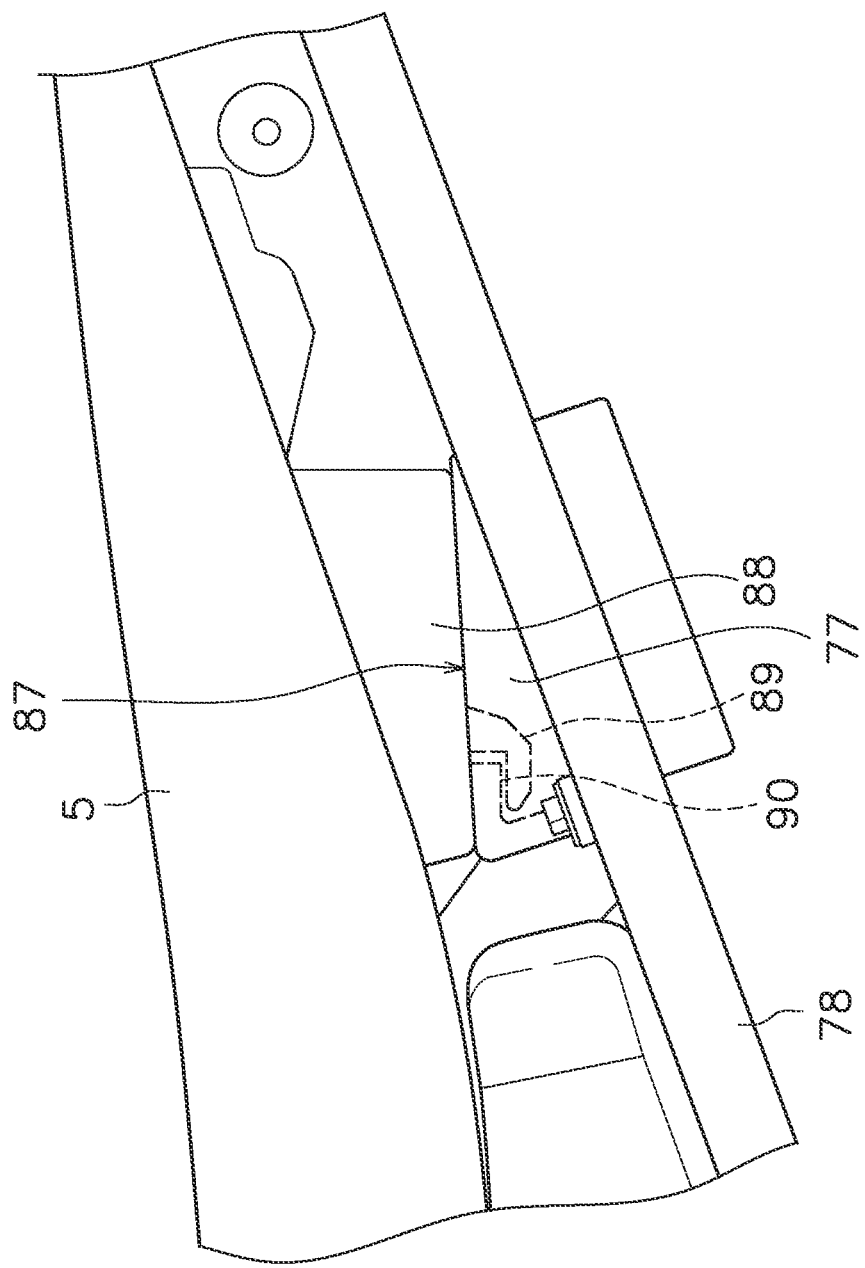
FIG. 13 is a diagram showing an example of a support structure of a seat.

FIG. 13 is a diagram showing an example of a support structure of the seat 5. As illustrated in FIG. 13, the battery bracket 77 may include a support surface 87. A bottom 88 of the seat 5 may be supported by the support surface 87 of the battery bracket 77. Further, the seat 5 may include a hook 89 for preventing the seat 5 from being lifted. The hook 89 may protrude from the bottom 88 of the seat 5. The battery bracket 77 may include a locking portion 90. The hook 89 may be locked to the locking portion 90 of the battery bracket 77 to prevent the seat 5 from being lifted. In this case, the number of parts is reduced as compared with the case where a separate part for receiving the load of the seat 5 is provided. As a result, the weight of the straddled vehicle 1 is reduced. The cost is also reduced.

REFERENCE SIGNS LIST

5: Seat, 9: Fuel tank, 11: Head pipe, 12: Main frame, 18: Air cleaner, 22: Air cleaner chamber, 27: First side cover, 31: First front portion, 34: First recess, 36: First intake port, 38: Intake passage, 41: First passage, 42: Second passage, 51: Partition member, 52: Central hole, 56: Side hole

The invention claimed is:

1. A straddled vehicle comprising:
a head pipe;
a main frame extending rearward from the head pipe in a front-to-rear direction of the straddled vehicle;
a fuel tank supported by the main frame;
an air cleaner arranged in front of the fuel tank;
a side cover that is arranged on a lateral side of the fuel tank and at least partially overlaps the fuel tank in a side view of the straddled vehicle;
an intake port that is provided at an edge of the side cover and opens toward an outside of the straddled vehicle; and
an air cleaner chamber in which at least a part of the air cleaner is arranged, wherein in the front-to-rear direction of the straddled vehicle,
the side cover includes a front portion located forward of the air cleaner,
the intake port is arranged rearward of the air cleaner, and
the side cover, the fuel tank, the intake port and the air cleaner chamber are so positioned and shaped that the side cover and a side surface of the fuel tank form an intake passage, through which the intake port communicates with the air cleaner chamber.

2. The straddled vehicle according to claim 1, wherein the intake port opens downward.

3. The straddled vehicle according to claim 1, wherein the edge of the side cover includes a recess that is upwardly recessed, and
the intake port is provided in the recess.

4. The straddled vehicle according to claim 1, wherein the side cover includes a rib arranged in the intake passage.

5. The straddled vehicle according to claim 1, wherein the side surface of the fuel tank has a shape recessed toward an inside of the fuel tank so that a space in the intake passage is expanded.

6. A straddled vehicle, comprising:
a head pipe;
a main frame extending rearward from the head pipe in a front-to-rear direction of the straddled vehicle;
a fuel tank supported by the main frame;
an air cleaner arranged in front of the fuel tank;
a side cover that is arranged on a lateral side of the fuel tank and at least partially overlaps the fuel tank in a side view of the straddled vehicle;
an intake port that is provided at an edge of the side cover and opens toward an outside of the straddled vehicle;
an air cleaner chamber in which at least a part of the air cleaner is arranged;
an intake passage that includes a first passage between the side cover and a side surface of the fuel tank, the intake port communicating with the air cleaner chamber through the intake passage; and
a seat arranged above the fuel tank, wherein
in the front-to-rear direction of the straddled vehicle,
the side cover includes a front portion located forward of the air cleaner, and
the intake port is arranged rearward of the air cleaner; and
the intake passage further includes a second passage between the seat and the fuel tank.

7. The straddled vehicle according to claim 6, further comprising:
a partition member arranged between the second passage and the air cleaner chamber, wherein
the partition member has a hole formed therein.

8. The straddled vehicle according to claim 6, further comprising:
a partition member arranged between the second passage and the air cleaner chamber, wherein
the partition member includes a side hole provided on a side portion of the partition member.

9. The straddled vehicle according to claim 8, wherein
the partition member further includes a central hole arranged between the side hole and a center of the partition member in a width direction of the straddled vehicle.

10. A straddled vehicle, comprising:
a head pipe;
a main frame extending rearward from the head pipe in a front-to-rear direction of the straddled vehicle;
a fuel tank supported by the main frame;
an air cleaner arranged in front of the fuel tank;
a side cover that is arranged on a lateral side of the fuel tank and at least partially overlaps the fuel tank in a side view of the straddled vehicle;
an intake port that is provided at an edge of the side cover and opens toward an outside of the straddled vehicle;
an air cleaner chamber in which at least a part of the air cleaner is arranged; and
an intake passage that includes a first passage between the side cover and a side surface of the fuel tank, the intake port communicating with the air cleaner chamber through the intake passage, wherein
in the front-to-rear direction of the straddled vehicle,
the side cover includes a front portion located forward of the air cleaner, and
the intake port is arranged rearward of the air cleaner;
the edge of the side cover includes a recess that is upwardly recessed;
the intake port is provided in the recess;
in the side view of the straddled vehicle, an edge of the recess overlaps the main frame; and
the intake port is arranged behind the main frame at the edge of the recess in the front-to- rear direction of the straddled vehicle.

* * * * *